July 2, 1929.  L. C. JOHNSON  1,719,330
TRACTOR WHEEL LUG CLEANER
Filed May 31, 1927
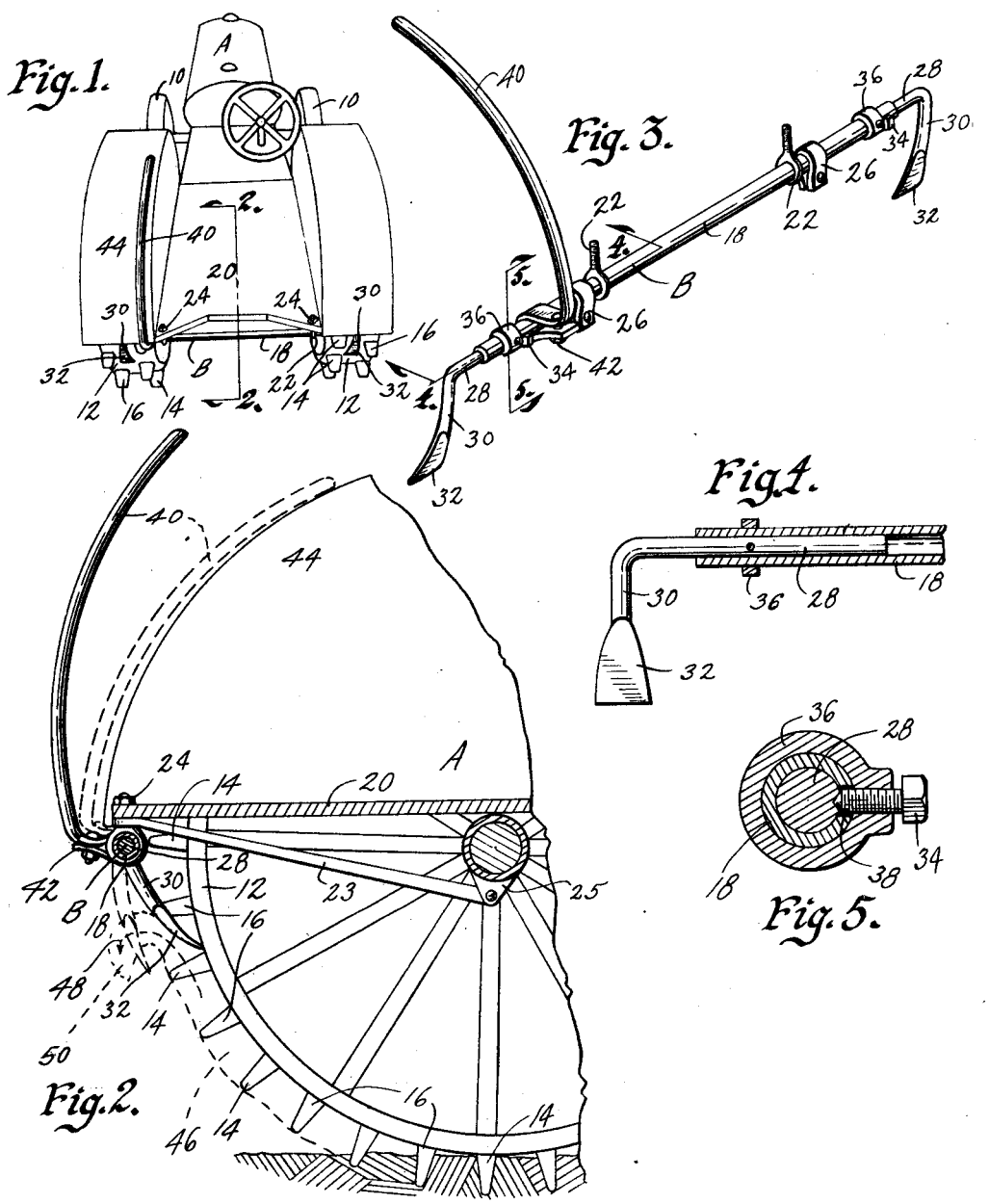
Witness
L. E. Long
Inventor
Luther C. Johnson
by Bair & Freeman Attorneys Patented July 2, 1929.

1,719,330

UNITED STATES PATENT OFFICE.

LUTHER C. JOHNSON, OF ESSEX, IOWA.

TRACTOR-WHEEL-LUG CLEANER.

Application filed May 31, 1927. Serial No. 195,223.

The object of my invention is to provide a tractor wheel lug cleaner of simple, durable and inexpensive construction.

It is well known by those skilled in the art that lugs are provided on tractor wheels for the purpose of increasing their traction by sinking in the earth or mud as the tractor travels over the ground and thereby forming a traction connection with the ground similar to a rack and gear. When the ground is muddy the space between the tractor lugs soon fills with mud until they are completely filled at which time the tractor wheel is similar to one with a smooth tread as the mud packs tightly in between the lugs and destroys their effectiveness.

In tractors of the type where two rows of lugs are provided with a space between the two rows whereby a peripheral groove, as it were, is formed between the lugs I have found that the lugs can easily be cleared of mud by inserting a scraper in this peripheral groove as the wheel rotates which effectively removes the mud and thereby allows the lugs to function.

It has therefore been my object to provide such a scraper device for the purpose of cleaning tractor wheel lugs which device can be easily installed in operative position on the frame of the tractor and can be moved to operative position when it is desired to clean the mud from the wheels of the tractor.

A further object of my invention is to provide such a device so constructed that it normally remains inoperative and it is merely necessary to move a lever to cause it to operatively engage the tractor wheels for removing the mud from the lugs thereof which operation is accomplished without further attention from the operator of the tractor.

A further object is to provide such a device so constructed that when the tractor wheel lugs are cleared of mud, the device will again automatically assume an inoperative position in readiness for the next cleaning operation.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a rear perspective view of a tractor illustrating my improved lug cleaner device installed thereon.

Figure 2 is an enlarged sectional view taken on the line 2—2 of Figure 1 illustrating the operative relation of my device with the tractor frame and one traction wheel of the tractor.

Figure 3 is a perspective view of the device detached from the tractor; and

Figures 4 and 5 are enlarged sectional views taken on the lines 4—4 and 5—5 respectively of Figure 3.

On the accompanying drawings I have used the reference character A to indicate generally a tractor and B to indicate generally my lug cleaner device attached thereto. The tractor A is provided with front wheels 10 and rear traction wheels 12.

The traction wheels 12 in this particular instance are provided with a double peripheral row of traction lugs indicated by the reference numerals 14 and 16. It will be noted that the rows of lugs 14 are positioned adjacent the inner edges of the wheels 12 and the lugs 16 are positioned adjacent the outer edges of the wheels 12 whereby peripheral grooves are provided between the rows of lugs 14 and 16.

My improved lug cleaner device comprises a tubular rock shaft 18 journaled on the under side of the platform 20 of the tractor A. Any convenient means can be provided for so journaling the rock shaft 18, my drawings illustrating a pair of eye bolts 22 secured to the platform 20 by nuts 24.

A pair of clamp collars 26 are provided on the outsides of the eye bolts 22 to prevent longitudinal movement of the rock shaft 18 with respect to the platform 20.

To strengthen the platform 20 and lend rigidity to the rock shaft 18, I provide a pair of braces 23 extending from the eye bolts 22 to a flange or the like 25 formed on the rear axle housings of the tractor.

Slidably mounted in each end of the tubular shaft 18 is a rod 28 having a downwardly extending portion 30 at its outer end. The portion 30 terminates in a widened and flattened scraper blade portion 32. The rod 28 is slidably mounted in the rock shaft 18 so that it can be adjusted to a tractor wheel, the distance of which from the center of the tractor might vary.

For maintaining such adjustment I provide a set screw 34. The set screw 34 is threaded through a collar 36 surrounding the rock shaft 18. The set screw 34 then extends through an opening 38 in the rock shaft 18 and engages the surface of the rod 28. A locking arrangement as just described is provided at each end of the rock shaft 18.

In normal inoperative position, the scraper blades 32 are spaced from the periphery of the tractor wheels 12 as clearly illustrated in Figure 2 of the drawings.

For moving the blades 32 to operative position, that is, to position engaging the peripheries of the tractor wheels 12 as illustrated in dotted lines in Figure 2, I provide a lever 40 having a clamp connection 42 to the rock shaft 18. The lever 40 normally rests against a fender 44 of the tractor as shown in dotted lines in Figure 4 and is held in such position due to gravity. When it is desired to operate the cleaner it is merely necessary to move the lever 40 backwardly to the full line position whereby the scraper blades 32 engage the peripheries of the tractor wheels for the purpose of scraping the mud therefrom between the rows of lugs 14 and 16. This operation, I have found also removes most of the mud from between adjacent lugs 14 and adjacent lugs 16 so that the entire wheel and lugs are practically cleared of mud after my device has been operated.

The inclination of the scraper blades 32 with relation to the tractor wheels 12 has a peculiar function which I will now describe. When the blades 32 are moved to operative position the mud on the tractor wheels has a tendency to maintain them in such position due to the cohesion between the mud and the tractor wheels. This is accomplished against the tendency of the weight of the lever 40 to move the scraper blades 32 back to their inoperative position. After one complete revolution of the tractor wheels 12, the mud has been removed from them and does not therefore continue to draw the blades toward the tractor wheels. The blades are then free to move to inoperative position as hereinbefore described.

From the description of my invention it will be obvious that I have provided a cleaner for tractor wheel lugs which works effectively and automatically requiring no further attention after being moved to operative position. In actual experience I have driven my tractor from mud holes under its own power which would be impossible without the use of my cleaner device. When the wheels start slipping, it is merely necessary to operate the scraper in order to remove the mud from between the lugs of the traction wheels so that they are rendered effective for obtaining the necessary traction for driving the tractor out of such mud holes.

In Figure 2 for instance I illustrate the mud 46 as filling the space between the lugs until engaged by the scraper 32 whereupon the mud will be scraped away from the wheel 12 as indicated by the arrow 48, the mud being so scraped being illustrated at 50.

Some changes can be made in the various parts of my device whereby it may be rendered more practical without departing from the real spirit and purpose of my invention, and it is my intention to cover by my claims, any modified forms of structure or use of mechanical equivalents, which may be reasonably included within their scope.

I claim as my invention:

1. An automatically operated scraper comprising a rock shaft journalled adjacent the periphery of a wheel of a tractor or the like, a scraper blade extending radially from said rock shaft and adapted to be moved to position engaging said wheel or to an inoperative position and a means for normally moving said scraper blade out of engagement with said wheel whereby the scraper blade will be held against the wheel, when moved to such position, due to the cohesion of the mud to the wheel and when the mud has been scraped therefrom, said means will move the blade away from the wheel.

2. In combination with a vehicle, a scraper device of the character described for cleaning a wheel of said vehicle, said device comprising a rock shaft, a scraper blade longitudinally adjustable thereon, means whereby said scraper blade is normally constrained to remain in position spaced from said wheel and a lever for swinging said rock shaft to cause said scraper blade to contact with said wheel to scrape the mud therefrom, the mud on the wheel when engaging said scraper blade serving to keep it in contact with the wheel in opposition to said means.

3. In combination with a vehicle, a scraper device of the character described for cleaning a pair of wheels of the vehicle, said device comprising a tubular rock shaft journalled on the frame of said vehicle, a rod slidably mounted in each end thereof, means for fixing said rods with relation to said tubular rock shaft, scraper blades formed on said rods and adapted to scrape mud from said wheels when the rock shaft is rocked to one position, a lever on said rock shaft constrained by gravity to move said rock shaft to position where said scraper blades do not contact with said wheels whereby said lever may be manually operated to cause such contact and said scraper blades will remain in such contact due to the cohesion of the mud to the wheels.

4. In combination with a platform having wheels for supporting the same and a fender over one of said wheels, a scraper comprising a rock shaft, a lever thereon adapted to normally engage said fender whereby said fender acts as a stop therefor, blades on said rock shaft adapted to be spaced from the wheels when the lever engages the fender whereby manual movement of said lever from such position will cause said blades to engage said wheels whereafter the cohesion of the mud to the wheels will maintain the blades thereagainst and after the mud has been scraped therefrom the lever will again assume its normal position.

LUTHER C. JOHNSON.